(12) United States Patent
Smith

(10) Patent No.: US 11,607,703 B2
(45) Date of Patent: Mar. 21, 2023

(54) SENSOR SYSTEM AND RELATED METHOD FOR ADJUSTING THE OPERATING POSITION OF SENSORS OF AN AGRICULTURAL SPRAYER

(71) Applicant: CNH Industrial America LLC, New Holland, PA (US)

(72) Inventor: Kevin M. Smith, Narvon, PA (US)

(73) Assignee: CNH Industrial America LLC, New Holland, PA (US)

( * ) Notice: Subject to any disclaimer, the term of this patent is extended or adjusted under 35 U.S.C. 154(b) by 412 days.

(21) Appl. No.: 16/814,202

(22) Filed: Mar. 10, 2020

(65) Prior Publication Data

US 2021/0283642 A1    Sep. 16, 2021

(51) Int. Cl.
*B05B 15/68* (2018.01)
*B05B 1/20* (2006.01)
*A01M 7/00* (2006.01)

(52) U.S. Cl.
CPC ........... *B05B 15/68* (2018.02); *A01M 7/0053* (2013.01); *A01M 7/0089* (2013.01); *B05B 1/20* (2013.01)

(58) Field of Classification Search
CPC .... B05B 15/68; A01M 7/0053; A01M 7/0089
USPC ....................................................... 222/505
See application file for complete search history.

(56) References Cited

U.S. PATENT DOCUMENTS

| 4,241,986 | A |   | 12/1980 | Thomson |            |
|-----------|---|---|---------|---------|------------|
| 5,763,873 | A | * | 6/1998  | Beck    | G01J 1/44  |
|           |   |   |         |         | 330/308    |
| 5,842,307 | A | * | 12/1998 | May     | A01M 7/0089 |
|           |   |   |         |         | 47/1.7     |
| 5,974,348 | A | * | 10/1999 | Rocks   | G01S 1/7034 |
|           |   |   |         |         | 701/28     |
| 6,009,354 | A | * | 12/1999 | Flamme  | A01C 7/102 |
|           |   |   |         |         | 700/184    |

(Continued)

FOREIGN PATENT DOCUMENTS

CN    104285578 B    3/2016

OTHER PUBLICATIONS

"AiCPlus—Instant, Intelligent & Individual Spraying," AGRIFAC Machinery B.V., (5 pages) Retrieved Jul. 13, 2019, https://www.agrifac.com.an.aicplus.

(Continued)

*Primary Examiner* — Chee-Chong Lee
(74) *Attorney, Agent, or Firm* — Rebecca Henkel; Rickard Demille

(57) ABSTRACT

A system for actuating a sensor of an agricultural sprayer may include a boom assembly and a sensor assembly supported on a portion of the boom assembly. The sensor assembly may include a field sensor movable relative to the portion of the boom assembly between an extended position and a retracted position, where the field sensor generates data indicative of one or more field conditions when in the extended position. The sensor assembly may further include a sensor actuator that moves the field sensor between the extended and retracted positions, and a controller that controls the sensor actuator to move the field sensor between the extended and retracted positions. The field sensor is spaced relative to the portion of the boom assembly by a larger distance when in the extended position than when in the retracted position.

20 Claims, 8 Drawing Sheets

(56) References Cited

U.S. PATENT DOCUMENTS

| | | | |
|---|---|---|---|
| 6,141,034 A | 10/2000 | McCutchen | |
| 6,336,051 B1* | 1/2002 | Pangels | A01D 41/1278 |
| | | | 700/207 |
| 7,388,662 B2* | 6/2008 | Cantin | G01N 15/0205 |
| | | | 356/338 |
| 9,148,995 B2 | 10/2015 | Hrnicek et al. | |
| 2014/0001276 A1 | 1/2014 | Joergensen et al. | |
| 2016/0038961 A1 | 2/2016 | Carlson et al. | |
| 2016/0262371 A1 | 9/2016 | Hiddema et al. | |
| 2017/0354137 A1 | 12/2017 | Dahlhauser et al. | |
| 2019/0104721 A1* | 4/2019 | Sullivan | A01G 25/09 |
| 2019/0105667 A1 | 4/2019 | Bharatiya et al. | |
| 2019/0150357 A1* | 5/2019 | Wu | G06T 7/73 |

OTHER PUBLICATIONS

Lilian Schaer, "Artificial Intelligence Offering a Brave New World of How of How You'll Farm, and Eat," Equipment, Guide Business, published Dec. 27, 2018, (5 pages), https://www.country-guide.ca/guide-business/artificial-intelligence-offering-a-brave-new-world-of-how-youll-farm-and-eat/.

"Eco-Friendly Agriculture Spray Technology Break Through," Farming UK News, (3 pages) Dated Oct. 27, 2015 https://www.farminguk.com/news/eco-friendly-agriculture-spray-technology-break-through_37535.html.

Adam Clarke, "How French Spraying Tech Can Slash Herbicide Spend by 80%," Farmers Weekly https://www.fwi.co.uk/machinery/technology/french-firms-reveal-their-next-generation-spraying-tech.

* cited by examiner

SENSOR SYSTEM AND RELATED METHOD FOR ADJUSTING THE OPERATING POSITION OF SENSORS OF AN AGRICULTURAL SPRAYER

FIELD OF THE INVENTION

The present disclosure relates generally to agricultural sprayers and, more particularly, to sensor systems for agricultural sprayers and related methods for adjusting the operating position of one or more sensors of an agricultural sprayer, such as between an extended position and a retracted position.

BACKGROUND OF THE INVENTION

Agricultural sprayers apply an agricultural substance (e.g., a pesticide, a nutrient, and/or the like) onto crops and/or a ground surface as the sprayer is traveling across a field. To facilitate such travel, sprayers are configured as self-propelled vehicles or implements towed behind an agricultural tractor or other suitable work vehicle. A typical sprayer includes an outwardly-extending boom assembly having a plurality of boom sections supporting a plurality of spaced apart nozzles. Each nozzle is configured to dispense or otherwise spray the agricultural substance onto underlying crops and/or weeds. The boom assembly is disposed in a "floating" arrangement during the spraying operation, wherein the boom sections are extended to cover wide swaths of the field. For transport, the boom assembly is folded to reduce the width of the sprayer.

Some sprayers may control the flow of agricultural substance through individual nozzles based on data received from sensors mounted on the boom sections that detect one or more field conditions (e.g., weeds, moisture content, etc.). Such sensors are typically fixed relative to the respective boom sections on which they are supported. However, when such sensors extend above or below the respective boom sections when the boom assembly is unfolded, the sensors may collide with other boom sections when the boom assembly is moved between its folded and unfolded orientations. Further, such sensors may collect debris while the boom assembly is folded, which requires an operator to then manually clean the sensors.

Accordingly, a sensor system and related method for adjusting an operating position of sensors of an agricultural sprayer would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a system for actuating a sensor of an agricultural sprayer. The system includes a boom assembly and a sensor assembly supported on a portion of the boom assembly. The sensor assembly includes a field sensor movable relative to the portion of the boom assembly between an extended position and a retracted position, with the field sensor being configured to generate data indicative of one or more field conditions when in the extended position. The sensor assembly further includes a sensor actuator configured to move the field sensor relative to the portion of the boom assembly between the extended position and the retracted position. Additionally, the system includes a controller communicatively coupled to the field sensor and the sensor actuator. The controller is configured to control the sensor actuator to selectively move the field sensor relative to the portion of the boom assembly between the extended position and the retracted position. The field sensor is spaced relative to the portion of the boom assembly by a first distance when the field sensor is in the extended position and is spaced apart relative to the portion of the boom assembly by a second distance when the field sensor is in the retracted position, with the first distance being larger than the second distance.

In another aspect, the present subject matter is directed to a method for actuating a sensor of an agricultural sprayer. The method includes receiving, with a computing device, an input indicative of adjusting a position of the field sensor supported on a portion of a boom assembly of the agricultural sprayer between an extended position and a retracted position relative to the portion of the boom assembly, with the field sensor being configured to generate data indicative of one or more field conditions when in the extended position. Additionally, the method includes controlling, with the computing device, a sensor actuator to actuate the field sensor relative to the portion of the boom assembly between the extended position and the retracted position based on the received input. The field sensor is spaced relative to the portion of the boom assembly by a first distance when the field sensor is in the extended position and is spaced apart relative to the portion of the boom assembly by a second distance when the field sensor is in the retracted position, with the first distance being larger than the second distance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

Figure 1:
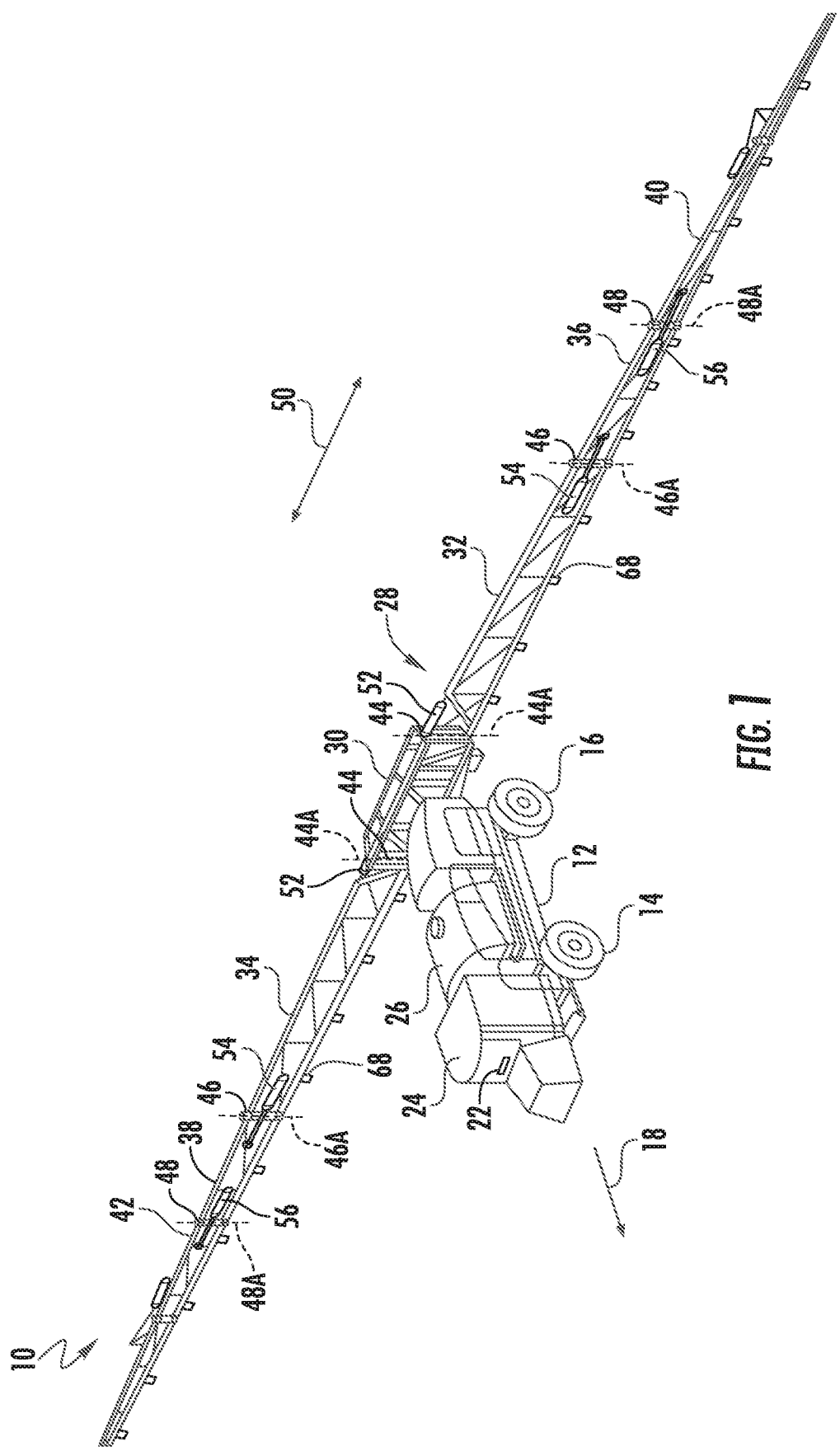
FIG. 1 illustrates a perspective view of one embodiment of an agricultural sprayer in accordance with aspects of the present subject matter.

Repeat use of reference characters in the present specification and drawings is intended to represent the same or analogous features or elements of the present technology.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to sensor systems and related methods for adjusting the operating position of sensors of an agricultural sprayer. Specifically, in several embodiments, the disclosed system may allow for a sensor supported on a portion of a boom assembly of an agricultural sprayer to be moved relative to the portion of the boom assembly between an extended position (e.g., at which the sensor is extended away from the portion of the boom assembly) and a retracted position (e.g., at which the sensor is retracted towards the portion of the boom assembly). In particular, the system may include a sensor actuator for moving the sensor between its extended and retracted positions relative to the portion of the boom assembly. The sensor actuator may be configured to move the sensor between its extended and retracted positions upon receipt of a request from an operator to move the sensor, upon a request to fold or unfold the boom assembly, and/or based on the position of the sensor relative to another portion or section of the boom assembly. Additionally, in some embodiments, the system may include a cover member configured to at least partially cover the sensor when the sensor is in its retracted position. The cover member may be one of the frame members of the portion of the boom assembly on which the sensor is supported or may be a separate member fixed to the portion of the boom assembly.

Figure 2:
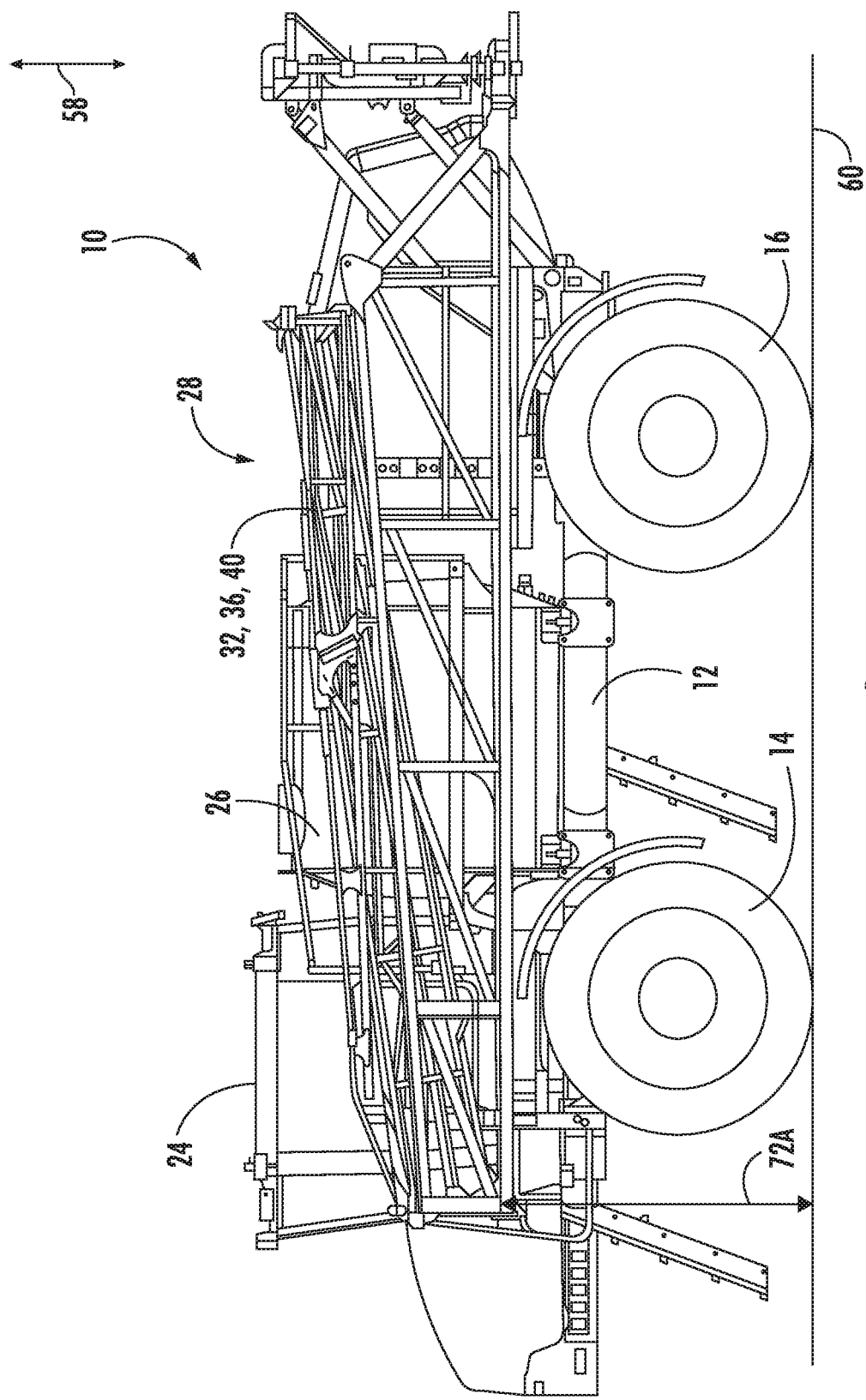
FIG. 2 illustrates a side view of an agricultural sprayer in accordance with aspects of the present subject matter, particularly illustrating the agricultural sprayer in a transport position.

Referring now to FIGS. 1 and 2, differing views of one embodiment of an agricultural sprayer 10 are illustrated in accordance with aspects of the present subject matter. Specifically, FIG. 1 illustrates a perspective view of the sprayer 10 with its boom assembly in a working or unfolded position and FIG. 2 illustrates a side view of the sprayer with its boom assembly in a transport or folded position. In the illustrated embodiment, the agricultural sprayer 10 is configured as a self-propelled agricultural sprayer. However, in alternative embodiments, the agricultural sprayer 10 may be configured as any other suitable type of agricultural sprayer 10 configured to perform agricultural spraying operations, such as a tractor or other vehicle configured to haul a spraying implement.

As shown in FIG. 1, the agricultural sprayer 10 may include a chassis or frame 12 configured to support or couple to a plurality of components. For example, a pair of steerable front wheels 14 (one is shown) and a pair of driven rear wheels 16 (one is shown) may be coupled to the frame 12. The wheels 14, 16 may be configured to support the agricultural sprayer 10 relative to the ground and move the agricultural sprayer 10 in a direction of travel (e.g., as indicated by arrow 18 in FIG. 1) across a field. In this regard, the agricultural sprayer 10 may include an engine (not shown) and a transmission (not shown) configured to transmit power from the engine to the wheels 14, 16. However, it should be appreciated that, in further embodiments, the front wheels 14 of the agricultural sprayer 10 may be driven in addition to or in lieu of the rear wheels 16. The frame 12 may also support an operator's cab 24 that houses various control or input devices (e.g., levers, pedals, control panels, buttons, and/or the like) for permitting an operator to control the operation of the work vehicle 10. For instance, as shown in FIG. 1, the agricultural sprayer 10 may include a user interface 22 for displaying message windows and/or alerts to the operator and/or for allowing the operator to interface with the vehicle's controller. In one embodiment, the user interface 22 may include buttons, knobs and/or any other suitable input devices that allow the operator to provide user inputs to the controller.

Furthermore, the frame 12 may also support a tank 26 and a frame or boom assembly 28 mounted on the frame 12. The tank 26 is generally configured to store or hold an agricultural product, such as a pesticide, a nutrient, and/or the like. As is generally understood, a plurality of nozzles 62 (FIG. 1) mounted on the boom assembly 28 may be configured to selectively dispense the agricultural product stored in the tank 26 onto the underlying plants and/or soil.

As shown in FIGS. 1 and 2, the boom assembly 28 of the agricultural sprayer 10 may generally be movable between a working or unfolded position (FIG. 1) and a transport or folded position (FIG. 2). In the working position, various sections of the boom assembly 28 are fully extended such that the boom assembly 28 extends over as wide a swath of a field as possible. In the transport position, the various sections of the boom assembly 28 are fully retracted to reduce the width of the sprayer 10 for travel. As will be described below, the boom assembly 28 may include a plurality of fold actuators coupled between adjacent boom sections of the boom assembly 28 for moving the boom assembly 28 between the working and transport positions.

As shown in FIG. 1, in one embodiment, the boom assembly 28 includes a central boom section 30, inner right and left boom sections 32, 34 pivotably coupled to the central boom section 30, right and left middle boom sections 36, 38 pivotably coupled to the respective right and left inner boom sections 32, 34, and right and left outer boom sections 40, 42 pivotably coupled to the respective right and left middle boom sections 36, 38. For example, each of the inner boom sections 32, 34 is pivotably coupled to the central boom section 30 at pivot joints 44. Similarly, the middle boom sections 36, 38 are pivotally coupled to the respective inner boom sections 32, 34 at pivot joints 46 while the outer boom sections 40, 42 are pivotably coupled to the respective middle boom sections 36, 38 at pivot joints 48.

As is generally understood, pivot joints 44, 46, 48 may be configured to allow relative pivotal motion between adjacent boom sections of the boom assembly 28. For example, the pivot joints 44, 46, 48 may allow for articulation of the various boom sections between a fully extended or working position (e.g., as shown in FIG. 1), in which the boom sections are unfolded along a lateral direction 50 of the boom assembly 28 to allow for the performance of an agricultural spraying operation, and a transport position (FIG. 2), in which the boom sections are folded inwardly to reduce the overall width of the boom assembly 28 along the lateral direction 50. It should be appreciated that, although the boom assembly 28 is shown in FIG. 1 as including a central boom section and three individual boom sections coupled to each side of the central boom sections, the boom assembly 28 may generally have any suitable number of boom sections.

Additionally, as shown in FIG. 1, the boom assembly 28 may include inner fold actuators 52 coupled between the inner boom sections 32, 34 and the central boom section 30 to enable pivoting or folding between the fully-extended working position and the transport position. For example, by retracting/extending the inner fold actuators 52, the inner boom sections 32, 34 may be pivoted or folded relative to the central boom section 30 about a pivot axis 44A defined by the pivot joints 44. Moreover, the boom assembly 28 may also include middle fold actuators 54 coupled between each inner boom section 32, 34 and its adjacent middle boom section 36, 38 and outer fold actuators 56 coupled between each middle boom section 36, 38 and its adjacent outer boom section 40, 42. As such, by retracting/extending the middle and outer fold actuators 54, 56, each middle and outer boom section 36, 38, 40, 42 may be pivoted or folded relative to its respective inwardly adjacent boom section 32, 34, 36, 38 about a respective pivot axis 46A, 48A. When moving to the transport position, the boom assembly 28 and fold actuators 52, 54, 56 are typically oriented such that the pivot axes 44A, 46A, 48A are parallel to the vertical direction 58 and, thus, the various boom sections 32, 34, 36, 38, 40, 42 of the boom assembly 28 are configured to be folded horizontally (e.g., parallel to the lateral direction 50) about the pivot axes 44A, 46A, 48A to keep the folding height of the boom assembly 28 as low as possible for transport. However, the pivot axes 44A, 46A, 48A may be oriented along any other suitable direction.

Moreover, the boom assembly 28 may be positioned above or otherwise be spaced apart along the vertical direction 58 from a field reference position, such as a field surface (as shown by line 60 in FIG. 2) of a field. The boom assembly 28 may be moved up or down to adjust the distance between the boom assembly 28 and the field surface 60 along the vertical direction 58. For instance, the boom assembly 28 may be positioned above or may otherwise be spaced apart from the field surface 60 by a first distance (e.g., as indicated by arrow 72 in FIG. 3) when the boom assembly 28 is in the working position and a second distance (e.g., as indicated by arrow 72A in FIG. 2) when the boom assembly 28 is in the transport position. It should be appreciated that, in other embodiments, the field reference position may correspond to any other suitable reference position within the field, such as a crop canopy or any other portion of the field that may serve as a reference with respect to which the boom assembly 28 is oriented.

Figure 3:
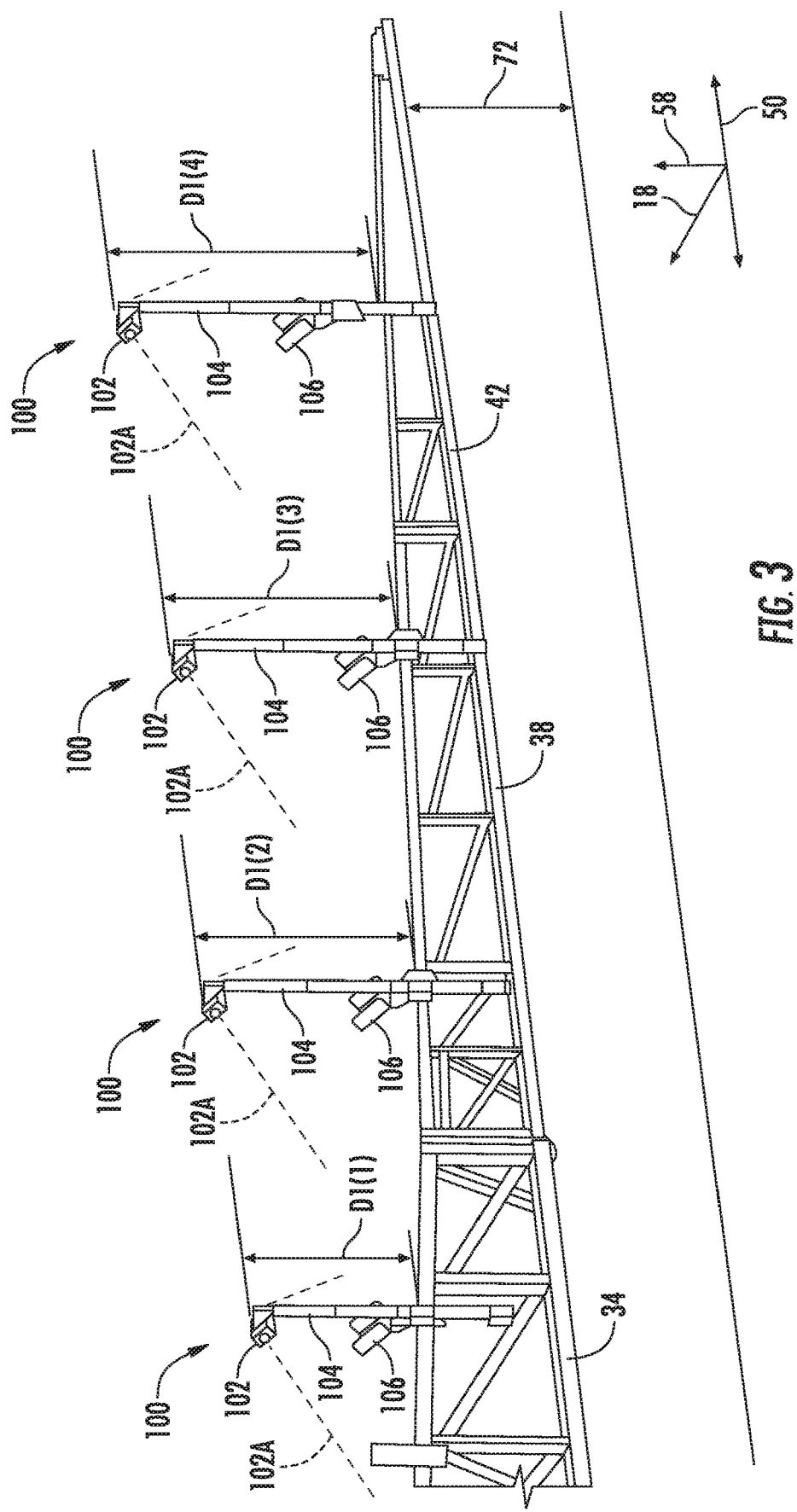
FIG. 3 illustrates a partial perspective view of a boom assembly of an agricultural sprayer in a working position, particularly illustrating sensor assemblies supported by the boom assembly in their respective extended positions in accordance with aspects of the present subject matter.
Figure 4:
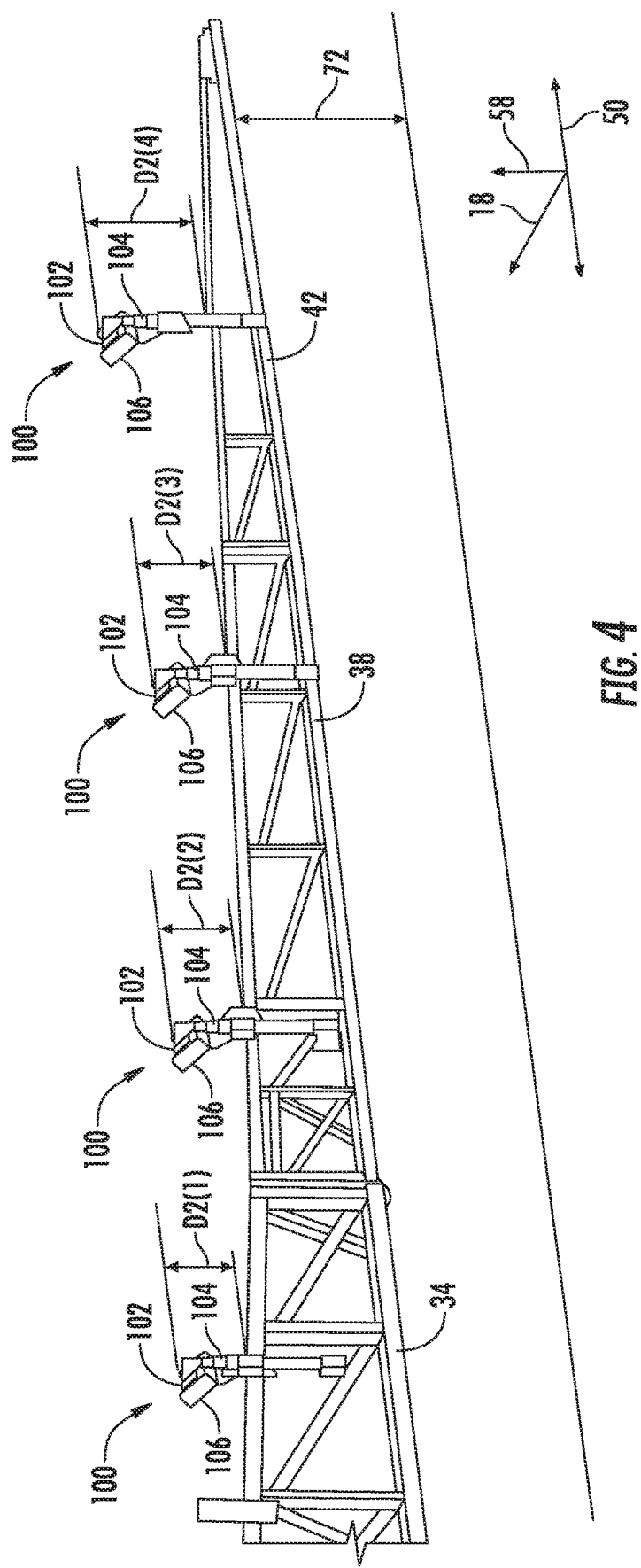
FIG. 4 illustrates another partial perspective view of the boom assembly shown in FIG. 3, particularly illustrating the sensor assemblies after being moved relative to the adjacent portion(s) of the boom assembly from their respective extended positions to their respective retracted positions in accordance with aspects of the present subject matter.
Figure 5:
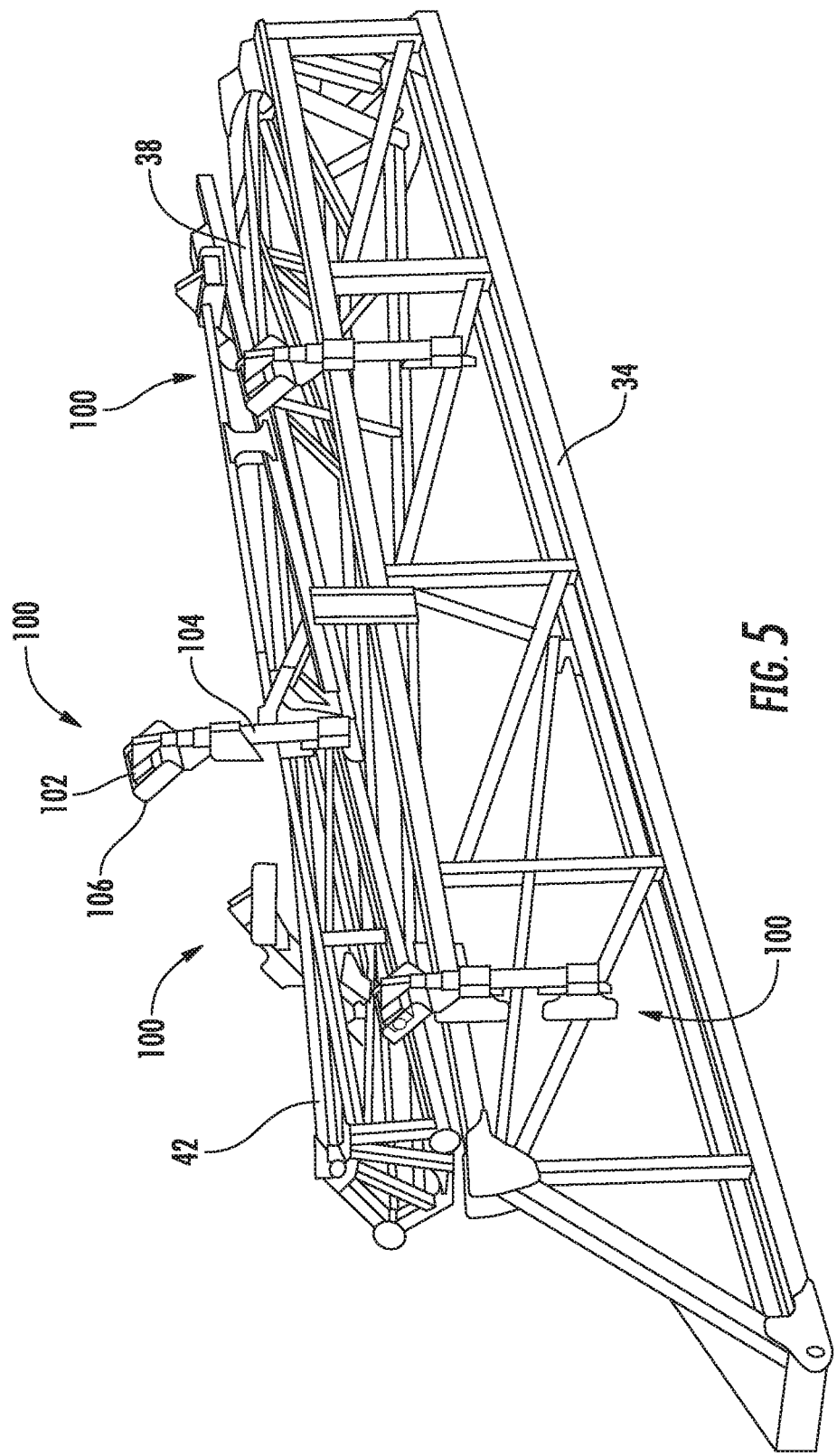
FIG. 5 illustrates a partial perspective view of a boom assembly of an agricultural sprayer in a transport position, particularly illustrating sensor assemblies supported by the boom assembly in their retracted transport positions in accordance with aspects of the present subject matter.

Referring now to FIGS. 3-5, various views of a sensor assembly 100 for use with a boom assembly is illustrated in accordance with aspects of the present subject matter. Specifically, FIGS. 3 and 4 illustrate a perspective view of a boom assembly of an agricultural sprayer in a working position, particularly illustrating a sensor assembly 100 supported by the boom assembly in an extended position (FIG. 3) and in a retracted position (FIG. 4). Additionally, FIG. 5 illustrates a partial perspective view of a boom assembly of an agricultural sprayer in a transport position, particularly illustrating a sensor assembly 100 supported by the boom assembly in the respective retracted position. In general, the sensor assembly 100 will be described herein with reference to the agricultural sprayer 10 and related boom assembly 28 described above with reference to FIGS. 1 and 2. However, it should be appreciated by those of ordinary skill in the art that the disclosed sensor assembly 100 may generally be used with agricultural sprayers having any other suitable sprayer configuration and/or boom assemblies having any other suitable boom configuration.

As shown in FIGS. 3-5, the boom assembly 28 of the sprayer 10 may be configured to support one or more sensor assemblies 100. Each sensor assembly 100 includes a field sensor 102 configured to generate data indicative of field conditions of a field, such as weeds, moisture content, and/or the like. The field sensor(s) 102 may be configured as any suitable sensor or combination of sensors configured to generate data indicative of such field conditions. For instance, the field sensor(s) 102 may be configured as a vision-based sensor, such as a camera(s), a light detection and ranging (LIDAR) device(s), and/or a radio detection and ranging (RADAR) sensor(s), an ultrasonic sensor, and/or the like. In several embodiments, a controller of the disclosed system may be configured to control a supply of agricultural product through the plurality of spray nozzles 62 based at least in part on data generated by the field sensor(s) 102 indicative of the field conditions relative to the sprayer 10. It should be appreciated that, while each sensor assembly 100 is shown as having only one field sensor 102, the sensor assembly(ies) 100 may be configured to have any other suitable number of field sensors 102, such as two or more field sensors 102.

In several embodiments, each field sensor 102 may be supported relative to the boom assembly 28 such that a field of view 102A of each field sensor 102 is directed towards the field. For instance, as shown in FIG. 3, the field of view 102A of each field sensor 102 is directed towards a forward portion of the field disposed forward of the boom assembly 28 relative to the direction of travel 18 of the sprayer 10. As such, the field sensor(s) 102 may be configured to generate data indicative of the field conditions associated with the respective portion of the field forward of the boom assembly 28 as the sprayer 10 moves across the field. However, it should be appreciated that the field sensor(s) 102 may be directed towards any other portion of the field relative to the boom assembly 28, such as a portion of the field behind the boom assembly 28 relative to the direction of travel 18 or alongside the boom assembly 28 in the lateral direction 50.

When collecting data, each field sensor 102 is preferably disposed at a position spaced apart from the boom assembly 28 to allow for improved visibility. For example, each field sensor 102 may be positioned above or below the boom assembly along the vertical direction 58, and/or forward of the boom assembly 28 along the direction of travel 18. For instance, as shown in FIG. 3, each field sensor 102 is positioned vertically above the associated boom sections 34, 38, 42 when the boom assembly 28 is in its unfolded or working position to allow the sensors 102 to have an unobstructed view of the field. However, at such extended positions, the field sensors 102 may interfere with one or more portions of the boom assembly 28 as the assembly 28 is being moved from its unfolded or working position to its folded or transport position.

As such, in accordance with aspects of the present subject matter, each sensor assembly 100 may further include a sensor actuator 104 provided in operative association with each field sensor 102, with each sensor actuator 104 being configured to actuate the respective field sensor 102 relative to the respective boom section 32, 34, 36, 38, 40, 42 on which the field sensor 102 is supported. For instance, as shown in FIGS. 3 and 4, the field sensor 102 supported on the inner boom section 34 is movable relative to the inner boom section 34 by the associated actuator 104, the field sensors 102 supported on the middle boom section 38 are movable relative to the middle boom section 38 by respective associated actuators 104, and the field sensor 102 supported on the outer boom section 42 is movable relative to the outer boom section 42 by the associated actuator 104.

In particular, each sensor actuator 104 may actuate the respective field sensor 102 between a working or extended position (FIG. 3) and a transport or retracted position (FIG. 4) relative to the respective supporting boom section of the boom assembly 28. More particularly, as shown in FIG. 3, when each field sensor 102 is in its extended position, the field sensor 102 is spaced apart from the adjacent section of the bottom assembly 28 (e.g., boom section 34, 38, 42) by a first distance D1 (e.g., D1(1), D1(2), D1(3), D1(4)). Similarly, when each field sensor 102 is in its retracted position, as shown in FIG. 4, the field sensor 102 is spaced apart from the adjacent section of the bottom assembly 28 (e.g., boom section 34, 38, 42) by a second distance D2 (e.g., D2(1), D2(2), D2(3), D2(4)). The first distance D1 is generally larger than the second distance D2, such that the boom assembly 28 has a smaller profile when the field sensors 102 are in their retracted positions. As such, when the field sensors 102 are in the retracted positions, the field sensors 102 will not interfere with or contact any other portions of the boom assembly 28 (e.g., adjacent boom sections to the supporting boom section) when the boom assembly 28 is in, or moved into or out of, the transport or folded position, as shown in FIG. 5.

It should be appreciated that while the first distances D1(1), D1(2), D1(3), D1(4) associated with the extended positions of the illustrated field sensors 102 are shown as being different from each other, the first distances D1(1), D1(2), D1(3), D1(4) may, in some embodiments, be equal. Further, in some embodiments, the first distances D1(1), D1(2), D1(3), D1(4) may be selected such that the field sensor(s) 102 extend the same distance from the field surface 60 when in their extended positions. The second distances D2(1), D2(2), D2(3), D2(4) associated with the retracted positions are similarly shown as being different from each other, however, the second distances D2(1), D2(2), D2(3), D2(4) may instead be equal to each other. Further, the second distances D2(1), D2(2), D2(3), D2(4) may be selected such that the field sensor(s) 102 extend the same distance from the field surface when in their retracted positions.

Each sensor actuator 104 may be configured as any suitable actuator. For instance, in one embodiment, each sensor actuator 104 may be configured as a linear actuator, such as an electric, hydraulic, or pneumatic cylinder, configured to linearly actuate the respective field sensor 102 between the extended and retracted positions. However, in other embodiments, each sensor actuator 104 may be configured as any other suitable actuator, such as a rotary actuator configured to pivot its respective field sensor 102 between the extended and retracted positions.

Figure 6:
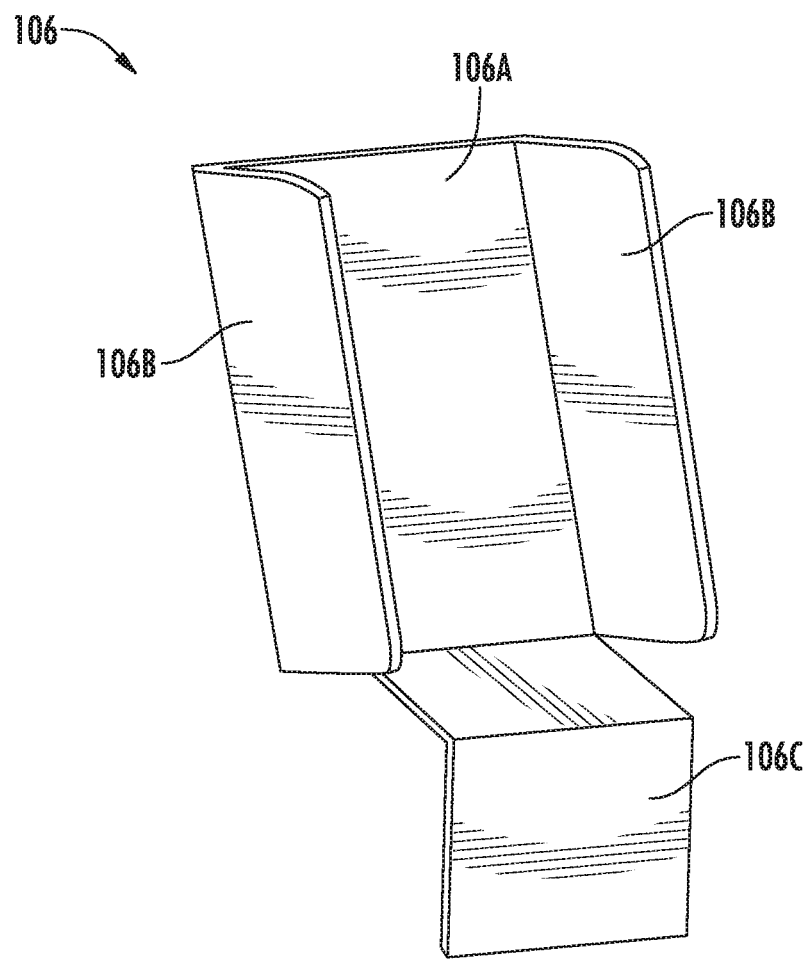
FIG. 6 illustrates a perspective view of a cover member of one of the sensor assemblies shown in FIG. 3 in accordance with aspects of the present subject matter.

Further, in some embodiments, each field sensor 102 may be configured to be at least partially covered when the sensor 102 is in its retracted position. In such embodiments, each sensor assembly 100 may include a cover member 106 configured to at least partially cover the associated field sensor 102 when the sensor 102 is in the retracted position. More particularly, each field sensor 102 may be movable relative to the associated cover member 106 such that the field of view 102A of the field sensor 102 is at least partially covered by the associated cover member 106 when moved into the retracted position and at least partially uncovered relative to the associated cover member 106 when moved out of the retracted position towards the extended position. For instance, as shown in FIG. 6, the cover member 106 may have a front panel 106A configured to at least partially cover the field of view of the respective field sensor. Additionally, the cover member 106 may include opposing sidewalls 106B extending outwardly from opposite sides of the front panel 106A and defining a slot or receptacle therebetween for receiving the associated field sensor. The front panel 106A and the opposing sidewalls 106B are configured to at least partially enclose the associated field sensor when the field sensor is in the retracted position. As such, the field sensors 102 may be protected against debris accumulation or damage during transportation that may affect the field of view 102A. For example, as shown in FIG. 4, each field sensor 102 is positioned relative to its respective cover member 106 (e.g., by being received within the slot or receptacle defined between the opposed sidewalls 106B of the cover member 106) such that the entire field of view of the field sensor(s) 102 is covered or obstructed (e.g., by a front wall of the cover member 106 and, optionally, the sidewalls 106B).

In some embodiments, each cover member 106 may be fixed relative to the boom assembly 28. For instance, in one embodiment, each cover member 106 may be rigidly mounted to the respective supporting section of the boom assembly 28 (e.g., by its mounting portion 106C). In other embodiments, each cover member 106 may be an existing element of the boom assembly 28, such as a frame member of the boom assembly 28. However, it should be appreciated that each cover member 106 may, instead, be movable relative to the boom assembly 28 and, optionally, its respective field sensor 102.

Additionally, in some embodiments, each sensor assembly 100 may include one or more position sensors 110 (FIG. 7) configured to monitor the position of the associated sensor assembly 100. For instance, in one embodiment, the position sensor(s) 110 may monitor the position of one or more portions of the associated sensor assembly 100 relative to another portion of the assembly 100. For example, the position sensor(s) 100 may monitor the position of the field sensor(s) 102 relative to the respective cover member(s) 106. In other embodiments, the position sensor(s) 110 may monitor the position of one or more portions of the associated sensor assembly 100 relative to portions of the boom assembly 28. For example, the position sensor(s) 100 may monitor the position of the field sensor(s) 102 relative to its supporting boom section, and additionally or alternatively, relative to other boom sections, for instance, boom sections adjacent to its supporting boom section. As such, the position sensor(s) 100 may be configured to determine the actual position of the field sensor(s) 102 relative its extended and retracted positions and/or the actual position of the field sensor(s) 102 relative to adjacent boom sections, instead of relying on the data from the actuator(s) 52, 54, 56, 104 to determine an estimated position of the field sensor(s) 102. The position of each field sensor 102 may, thus, be used to monitor the associated sensor assembly 100 for interference when moving the boom assembly 28 between the folded and unfolded positions.

It should be appreciated that the position sensor(s) 110 may be configured as any suitable sensor for monitoring the position of the associated sensor assembly 100. For instance, the position sensor(s) 110 may be configured as one or more of a Hall-effect sensor, a laser sensor, a LIDAR device, an ultrasonic sensor, a proximity sensor, and/or the like.

Figure 7:
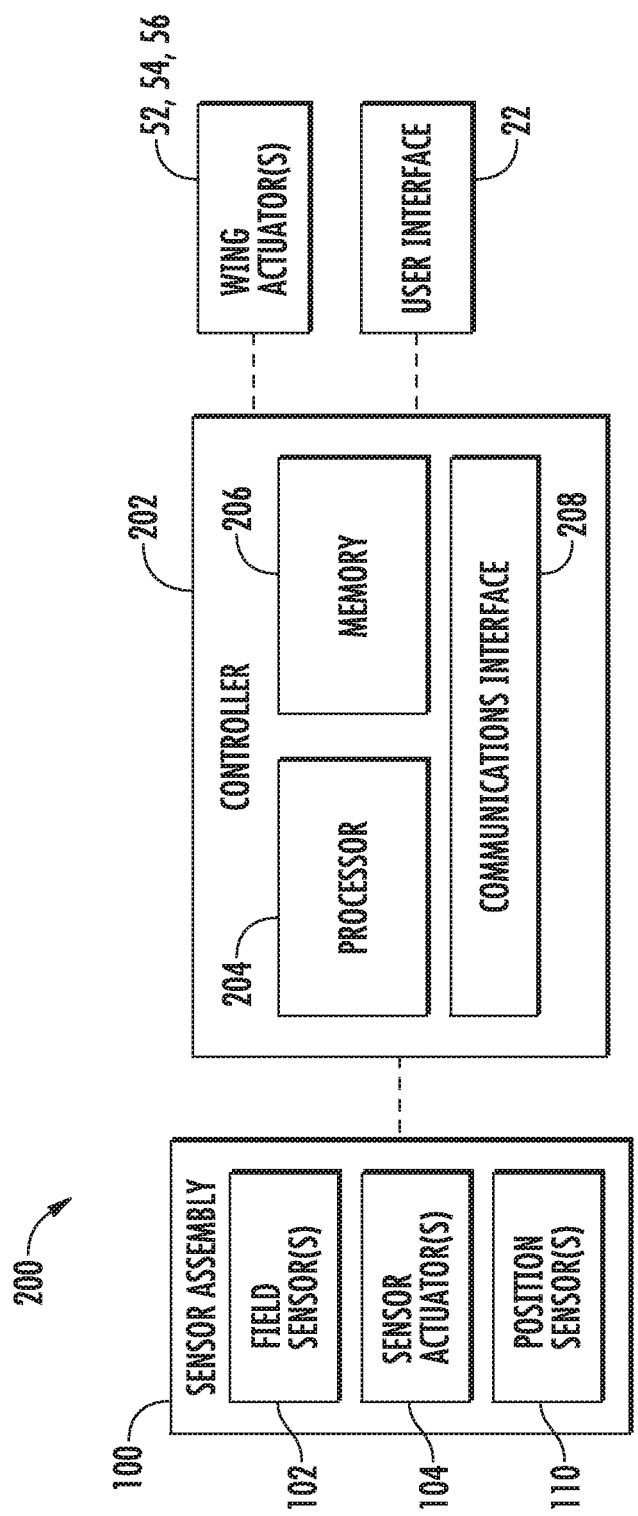
FIG. 7 illustrates a schematic view of a sensor system for an agricultural sprayer in accordance with aspects of the present subject matter.

Referring now to FIG. 7, a schematic view of one embodiment of a sensor system 200 for an agricultural sprayer is illustrated in accordance with aspects of the present subject matter. In general, the system 200 will be described herein with reference to the agricultural sprayer 10 and the boom assembly 28 described above with reference to FIGS. 1-2, as well as the sensor assembly 100 described above with reference to FIGS. 3-6. However, it should be appreciated by those of ordinary skill in the art that the disclosed system 200 may generally be utilized with agricultural sprayers having any suitable sprayer configuration, boom assemblies having any other suitable assembly configuration, and/or with sensor assemblies having any other suitable assembly configuration. Additionally, it should be appreciated that, for purposes of illustration, communicative links or electrical couplings of the system 200 shown in FIG. 7 are indicated by dashed lines.

As shown in FIG. 7, the system 200 may include a controller 202 communicatively coupled to one or more components of the agricultural sprayer 10, such as a sensor assembly (e.g., sensor assembly 100) having one or more sensors (e.g., field sensors 102) that are used to detect one or more parameters associated with field conditions of a field (e.g., weeds, moisture, and/or the like), and having one or more actuators (e.g., actuator(s) 104) configured to actuate the associated sensor(s) 102. Further, in some embodiments, the sensor assembly 100 may include one or more sensors (e.g., position sensors 110) that are used to detect a position of the sensor assembly 100 (e.g., the sensor(s) 102 and/or actuator(s) 104). The controller 202 may further be communicatively coupled to one or more wing actuators (e.g., actuator(s) 52, 56, 56) of the agricultural sprayer 10 configured to actuate the various boom sections 32, 34, 36, 38, 40, 42 of the boom assembly 28. Additionally, the system 200 may be coupled to a user interface (e.g., user interface 22). As indicated above, the user interface 22 described herein may include, without limitation, any combination of input and/or output devices that allow an operator to provide inputs to the controller 202 and/or that allow the controller 202 to provide feedback to the operator, such as a keyboard, keypad, pointing device, buttons, knobs, touch sensitive screen, mobile device, audio input device, audio output device, and/or the like.

In general, the controller 202 may comprise any suitable processor-based device known in the art, such as a computing device or any suitable combination of computing devices. Thus, in several embodiments, the controller 202 may include one or more processor(s) 204, and associated memory device(s) 206 configured to perform a variety of computer-implemented functions. As used herein, the term "processor" refers not only to integrated circuits referred to in the art as being included in a computer, but also refers to a controller, a microcontroller, a microcomputer, a programmable logic circuit (PLC), an application specific integrated circuit, and other programmable circuits. Additionally, the memory device(s) 206 of the controller 202 may generally comprise memory element(s) including, but not limited to, a computer readable medium (e.g., random access memory RAM)), a computer readable non-volatile medium (e.g., a flash memory), a floppy disk, a compact disk-read only memory (CD-ROM), a magneto-optical disk (MOD), a digital versatile disk (DVD) and/or other suitable memory elements. Such memory device(s) 206 may generally be configured to store suitable computer-readable instructions that, when implemented by the processor(s) 204, configure the controller 202 to perform various computer-implemented functions, such as one or more aspects of the methods and algorithms that will be described herein. In addition, the controller 202 may also include various other suitable components, such as a communications circuit or module, one or more input/output channels, a data/control bus and/or the like.

In several embodiments, the controller 202 may correspond to an existing controller of the agricultural sprayer 10. However, it should be appreciated that, in other embodiments, the controller 202 may instead correspond to a separate processing device. For instance, in one embodiment, the controller 202 may form all or part of a separate plug-in module that may be installed within the agricultural sprayer 10 to allow for the disclosed system and method to be implemented without requiring additional software to be uploaded onto existing control devices of the agricultural sprayer 10.

In some embodiments, the controller 202 may include a communications module or interface 208 to allow for the controller 202 to communicate with and/or electronically control any of the various system components described herein. For instance, one or more communicative links or interfaces (e.g., one or more data buses) may be provided between the communications interface 208 and the sensor(s) 102, 110 to allow data to be transmitted from the sensor(s) 102, 110 to the controller 202. Similarly, one or more communicative links or interfaces (e.g., one or more data buses) may be provided between the communications interface 208 and the actuator(s) 52, 54, 56, 106 to allow the controller 202 to control the operation of one or more components of the actuator(s) 52, 54, 56, 104. Additionally, one or more communicative links or interfaces (e.g., one or more data buses) may be provided between the communications interface 208 and a user interface (e.g., user interface 22) to allow operator inputs to be received by the controller 202 and/or the allow the controller 202 to control the operation of one or more components of the user interface 22.

As described above, the field sensor(s) 102 may be configured to generate data indicative of one or more field conditions (e.g., weeds, moisture content, etc.) within a field. The field sensor(s) 102 is supported by a portion of the sprayer boom 28 such that the field sensor(s) 102 are movable relative to such portion of the sprayer boom 28 by the respective sensor actuator(s) 104 between an extended position and a retracted position. When the field sensor(s) 102 is in the extended position, the field sensor(s) 102 is positioned such that the field sensor(s) 102 may generate the data indicative of the field conditions. For example, the field sensor(s) 102 may be positioned vertically above the boom assembly 28 in the extended position, with the field of view 102A of each field sensor(s) 102 being directed towards the field. However, when the field sensor(s) 102 is in the retracted position, the field sensor(s) 102 is positioned closer to the boom assembly 28 than in the extended position such that the boom assembly 28 has a smaller profile, with the field of view 102A of the field sensor(s) 102 being optionally at least partially covered by an associated cover member(s) 106.

The controller 202 may be configured to control the operation of the sensor actuator(s) 104 based at least in part on an input from an operator provided via the user interface 22 to move the field sensor(s) 102, an input associated with folding or unfolding of the boom assembly 28, and/or the position of the field sensor(s) 102 relative to a section of the boom assembly 28 other than the section of the boom assembly 28 on which the field sensor(s) 102 is supported. For instance, the controller 202 may receive an operator input via the user interface 22 indicative of moving the sensor actuator(s) 104 into the extended position or the retracted position and, in return, control the operation of the sensor actuator(s) 104 to actuate the field sensor(s) 102 according to the operator input.

Similarly, the controller 202 may receive an input indicative of moving the boom assembly 28 between the working and transport positions and, in return, control the operation of the wing actuator(s) 52, 54, 56 to move the boom assembly 28 between the working and transport positions and the sensor actuator(s) 104 to actuate the field sensor(s) 102 relative to the supporting section(s) of the boom assembly 28 between the extended and retracted positions. For instance, the controller 202 may receive an operator input indicative of moving the boom assembly 28 between the working and retracted positions. In such embodiments, the controller 202 may be configured to control one or more of the sensor actuators 104 to actuate the field sensor(s) 102 before, during, or after controlling one or more of the wing actuators 52, 54, 54 to actuate the boom sections.

Further, the controller 202 may monitor the position of the field sensor(s) 102 relative to a section of the boom assembly 28 other than the section of the boom assembly 28 on which the field sensor(s) 102 is supported based at least in part on data received from the position sensor(s) 110, and control the sensor actuator(s) 104 to actuate the field sensor(s) 102 relative to the supporting section(s) of the boom assembly 28 between the extended and transport positions based on the monitored position. For instance, if the distance between the field sensor(s) 102 and a portion of the boom assembly falls below a threshold distance when the boom assembly 28 is being folded into the transport position, the controller 202 may control the sensor actuator(s) 104 to actuate the field sensor(s) 102 into the retracted position. Similarly, if the distance between the field sensor(s) 102 and a portion of the boom assembly exceeds a threshold distance when the boom assembly 28 is being unfolded into the working position, the controller 202 may control the sensor actuator(s) 104 to actuate the field sensor(s) 102 into the extended position.

Additionally, or alternatively, the controller 202 may prevent the boom assembly 28 from folding or unfolding based on an operator input if it is determined that an interference between the field sensor(s) 102 and a portion(s) of the boom assembly 28 will occur based on the current position of the field sensor(s) 102. For instance, the controller 202 may monitor the position of the field sensor(s) 102 based at least in part on data received from the position sensor(s) 110 and/or the sensor actuator(s) 104, and prevent the fold actuators 52, 54, 56 from folding the boom sections if the position of the field sensor(s) 102 will cause an interference (e.g., if the field sensor(s) 102 are not in their retracted positions). Further, the controller 202 may notify an operator of the detected, potential interference.

Such system 200 thus prevents interference between the sensor assembly(ies) 100 and portions of the boom assembly 28 when the boom assembly 28 is moved between the working and transport positions, without sacrificing the improved visibility provided by the extended position of the field sensor(s) 102. Additionally, such system 200 may prevent material accumulation on or damage of the field sensor(s) 102 when the sensor(s) 102 is in the retracted position.

Figure 8:
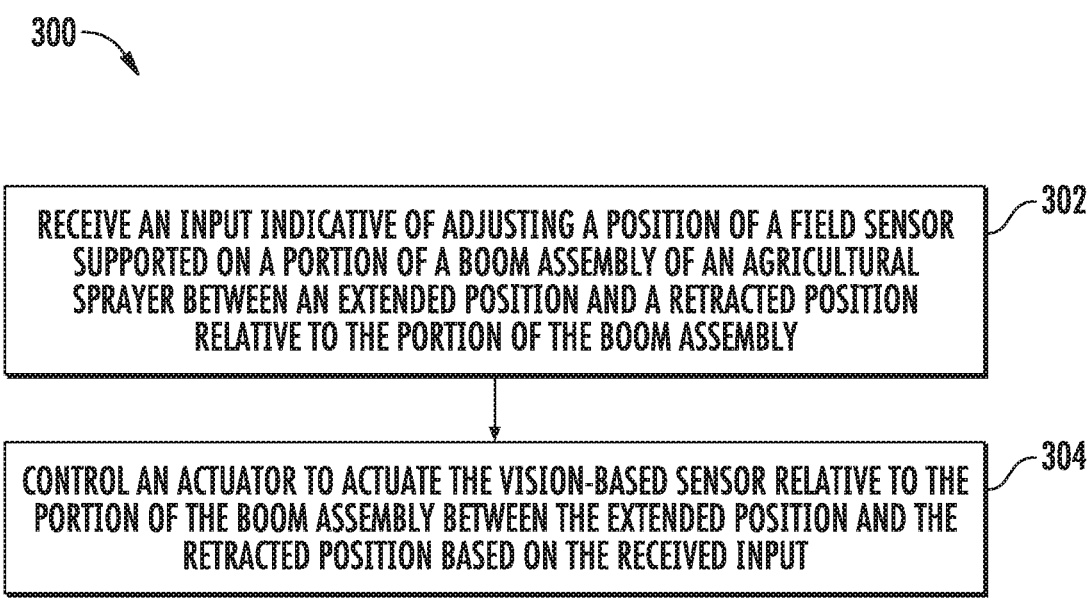
FIG. 8 illustrates a method for adjusting the operating position of sensors of an agricultural sprayer in accordance with aspects of the present subject matter.

Referring now to FIG. 8, a flow diagram of one embodiment of a method 300 for adjusting an operating position of sensors of an agricultural sprayer is illustrated in accordance with aspects of the present subject matter. In general, the method 300 will be described herein with reference to the agricultural sprayer 10 and the boom assembly 28 shown in FIGS. 1 and 2, as well as the sensor assembly 100 shown in FIGS. 3-6 and various system components shown in FIG. 7. However, it should be appreciated that the disclosed method 300 may be implemented with agricultural sprayers and/or boom assemblies having any other suitable configurations, with sensor assemblies having any other suitable configurations, and/or within systems having any other suitable system configuration. In addition, although FIG. 8 depicts steps performed in a particular order for purposes of illustration and discussion, the methods discussed herein are not limited to any particular order or arrangement. One skilled in the art, using the disclosures provided herein, will appreciate that various steps of the methods disclosed herein can be omitted, rearranged, combined, and/or adapted in various ways without deviating from the scope of the present disclosure.

As shown in FIG. 8, at (302), the method 300 may include receiving an input indicative of adjusting a position of the field sensor supported on a portion of a boom assembly of the agricultural sprayer between an extended position and a retracted position relative to the portion of the boom assembly. For instance, as indicated above, the controller 202 may receive an input from an operator via the user interface 22 and/or from the position sensor(s) 110 indicative of adjusting the position of the field sensor(s) 102 supported on a respective boom section(s) between an extended position and a retracted position relative to the respective boom section(s).

Additionally, at (304), the method 300 may include controlling a sensor actuator to actuate the field sensor relative to the portion of the boom assembly between the extended position and the retracted position based on the received input. For example, as discussed above, the controller 202 may be configured to control the sensor actuator(s) 104 to actuate the field sensor(s) 102 relative to the respective boom section(s) between the extended position and the retracted position based on the received input.

It is to be understood that the steps of the method 300 are performed by the controller 202 upon loading and executing software code or instructions which are tangibly stored on a tangible computer readable medium, such as on a magnetic medium, e.g., a computer hard drive, an optical medium, e.g., an optical disk, solid-state memory, e.g., flash memory, or other storage media known in the art. Thus, any of the functionality performed by the controller 202 described herein, such as the method 300, is implemented in software code or instructions which are tangibly stored on a tangible computer readable medium. The controller 202 loads the software code or instructions via a direct interface with the computer readable medium or via a wired and/or wireless network. Upon loading and executing such software code or instructions by the controller 202, the controller 202 may perform any of the functionality of the controller 202 described herein, including any steps of the method 300 described herein.

The term "software code" or "code" used herein refers to any instructions or set of instructions that influence the operation of a computer or controller. They may exist in a computer-executable form, such as machine code, which is the set of instructions and data directly executed by a computer's central processing unit or by a controller, a human-understandable form, such as source code, which may be compiled in order to be executed by a computer's central processing unit or by a controller, or an intermediate form, such as object code, which is produced by a compiler. As used herein, the term "software code" or "code" also includes any human-understandable computer instructions or set of instructions, e.g., a script, that may be executed on the fly with the aid of an interpreter executed by a computer's central processing unit or by a controller.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A sensor system for an agricultural sprayer, comprising:
a boom assembly including a cover member;
a sensor assembly supported on a portion of the boom assembly, the sensor assembly comprising:
a field sensor movable relative to the portion of the boom assembly between an extended position and a retracted position, the field sensor being spaced relative to the portion of the boom assembly by a first distance when the field sensor is in the extended position and being spaced apart relative to the portion of the boom assembly by a second distance when the field sensor is in the retracted position, the first distance being larger than the second distance, a field of view of the field sensor being uncovered and directable towards a field surface of a field when the field sensor is in the extended position such that the field sensor is configured to generate data indicative of one or more field conditions when in the extended position, the field of view of the field sensor being at least partially covered by the cover member when the field sensor is in the retracted position; and
a sensor actuator configured to move the field sensor relative to the portion of the boom assembly between the extended position and the retracted position; and
a controller communicatively coupled to the field sensor and the sensor actuator, the controller being configured to control the sensor actuator to selectively move the field sensor relative to the portion of the boom assembly between the extended position and the retracted position.

2. The system of claim 1, wherein the boom assembly comprises a first boom section, a second boom section, and a fold actuator, the fold actuator configured to actuate the second boom section relative to the first boom section between a boom working position and a boom transport position, and
wherein the portion of the boom assembly is one of the first boom section or the second boom section.

3. The system of claim 2, wherein the controller is configured to control the sensor actuator to move the field sensor relative to the one of the first boom section or the second boom section between the extended position and the retracted position based at least in part on an input to control the fold actuator to actuate the second boom section between the boom working position and the boom transport position.

4. The system of claim 2, wherein the sensor assembly further comprises a position sensor configured to detect a position of the field sensor relative to another of the first boom section or the second boom section, the controller being configured to control the sensor actuator to move the field sensor relative to the one of the first boom section or the second boom section between the extended position and the retracted position based on the position of the field sensor relative to the other of the first boom section or the second boom section.

5. The system of claim 1, wherein the field surface is forward of the boom assembly relative to a direction of travel of the agricultural sprayer.

6. The system of claim 1, wherein the cover member is fixed relative to the portion of the boom assembly.

7. The system of claim 1, wherein the cover member comprises a front panel and at least two opposing side walls extending from the front panel, the at least two opposing side walls defining a slot for receiving the field sensor when the field sensor is in the retracted position, the front panel being configured to at least partially cover the field of view of the field sensor.

8. The system of claim 1, wherein the field sensor comprises at least one of a camera, a light detection and ranging (LIDAR) device, a radio detection and ranging (RADAR) sensor, or an ultrasonic sensor.

9. The system of claim 1, further comprising a plurality of spray nozzles fixedly coupled to the boom assembly, wherein the controller is further configured to control a supply of agricultural product through the plurality of spray nozzles based at least in part on the data generated by the field sensor.

10. The system of claim 1, wherein the cover member is a frame member of the portion of the boom assembly.

11. A method for adjusting the operating position of sensors of an agricultural sprayer, the agricultural sprayer including a boom assembly and a field sensor supported on a portion of the boom assembly, the method comprising:
receiving, with a computing device, an input indicative of adjusting a position of the field sensor relative to the portion of the boom assembly between an extended position and a retracted position, a field of view of the field sensor being uncovered and directable towards a field surface of a field when the field sensor is in the extended position, the field of view such that the field sensor is configured to generate data indicative of one or more field conditions when in the extended position, the field of view of the field sensor being at least partially covered by a cover member of the boom assembly when the field sensor is in the retracted position; and
controlling, with the computing device, a sensor actuator to actuate the field sensor relative to the portion of the boom assembly between the extended position and the retracted position based on the received input,
wherein the field sensor is spaced relative to the portion of the boom assembly by a first distance when the field sensor is in the extended position and is spaced apart relative to the portion of the boom assembly by a second distance when the field sensor is in the retracted position, the first distance being larger than the second distance.

12. The method of claim 11, wherein the boom assembly comprises a first boom section, a second boom section, and a fold actuator, the fold actuator configured to actuate the second boom section relative to the first boom section between a boom working position and a boom transport position, and
wherein the portion of the boom assembly is one of the first boom section or the second boom section.

13. The method of claim 12, wherein the input indicative of adjusting the position of the field sensor comprises an input indicative of adjusting the position of the second boom section between the boom working position and the boom transport position.

14. The method of claim 12, wherein the input indicative of adjusting the position of the second boom section between the boom working position and the boom transport position is received from a position sensor configured to monitor the position of the field sensor relative to another of the first boom section or the second boom section.

15. The method of claim 11, wherein the input indicative of adjusting the position of the field sensor is received from a user-interface.

16. The method of claim 11, wherein the cover member is fixed relative to the boom assembly.

17. The method of claim 11, wherein the cover member comprises a front panel and at least two opposing side walls extending from the front panel, the at least two opposing side walls defining a slot for receiving the field sensor when the field sensor is in the retracted position, the front panel being configured to at least partially cover the field of view of the field sensor.

18. The method of claim 11, wherein the field sensor comprises at least one of a camera, a light detection and ranging (LIDAR) device, a radio detection and ranging (RADAR) sensor, or an ultrasonic sensor.

19. The method of claim 11, further comprising controlling, with the computing device, a supply of agricultural product through a plurality of spray nozzles fixedly coupled to the boom assembly based at least in part on the data generated by the field sensor.

20. A sensor system for an agricultural sprayer, comprising:
a boom assembly including a cover member, the cover member comprising a front panel and at least two opposing side walls extending from the front panel, the at least two opposing side walls defining a slot;
a sensor assembly supported on a portion of the boom assembly, the sensor assembly comprising:
a field sensor movable relative to the portion of the boom assembly between an extended position and a retracted position, the field sensor being spaced relative to the portion of the boom assembly by a first distance when the field sensor is in the extended position and being spaced apart relative to the portion of the boom assembly by a second distance when the field sensor is in the retracted position, the first distance being larger than the second distance, a field of view of the field sensor being directable towards a field surface of a field when the field sensor is in the extended position such that the field sensor is configured to generate data indicative of one or more field conditions when in the extended position, the field sensor being received in the slot of the cover member the field sensor when the field sensor is in the retracted position such the front panel of the cover member at least partially covers the field of view of the field sensor; and
a sensor actuator configured to move the field sensor relative to the portion of the boom assembly between the extended position and the retracted position; and
a controller communicatively coupled to the field sensor and the sensor actuator, the controller being configured to control the sensor actuator to selectively move the field sensor relative to the portion of the boom assembly between the extended position and the retracted position.

* * * * *